United States Patent [19]

Tatami

[11] 4,404,583
[45] Sep. 13, 1983

[54] METHOD AND APPARATUS FOR DETERMINING AND CONTROLLING THE SAMPLING PHASE IN SAMPLING THE BURST SIGNAL OF A COLOR TELEVISION SIGNAL

[75] Inventor: Mitsushige Tatami, Ebina, Japan

[73] Assignee: Sony Corporation, Tokyo, Japan

[21] Appl. No.: 277,895

[22] Filed: Jun. 26, 1981

[30] Foreign Application Priority Data

Jul. 2, 1980 [JP] Japan ................................. 55-90179

[51] Int. Cl.³ ............................................. H04N 9/46
[52] U.S. Cl. ........................................ 358/13; 358/19
[58] Field of Search ........................ 358/13, 17, 19, 12

[56] References Cited

U.S. PATENT DOCUMENTS 4,122,487 10/1978 Beaulier ................................. 358/13
4,227,204 10/1980 Rossi ..................................... 358/13
4,291,332 9/1981 Kato ..................................... 358/19
4,301,466 11/1981 Lemoine .............................. 358/13

Primary Examiner—Michael A. Masinick
Attorney, Agent, or Firm—Lewis H. Eslinger; Alvin Sinderbrand

[57] ABSTRACT

The burst signal of a color television signal is sampled at a rate which is a multiple of the burst signal frequency. A theoretical sample level of the burst signal is determined as a function of at least two of the actual sample levels thereof, the theoretical sample level representing a sample level that would be obtained if the burst signal is sampled at a predetermined phase angle. Based on the theoretical sample level and a predetermined one of the actual sample levels, a determination is made as to whether the burst signal actually is sampled at the predetermined phase angle. The phase of the sampling pulses which are used to sample the burst signal, is adjusted in accordance with the determination, such that the burst signal is sampled at the predetermined phase angle.

36 Claims, 7 Drawing Figures

METHOD AND APPARATUS FOR DETERMINING AND CONTROLLING THE SAMPLING PHASE IN SAMPLING THE BURST SIGNAL OF A COLOR TELEVISION SIGNAL

BACKGROUND OF THE INVENTION

This invention relates to a method and apparatus for determining whether the burst signal of a color television signal is sampled at a predetermined phase angle and, more particularly, to a method and apparatus for using this determination to control the actual sampling phase. The present invention is particularly useful in digitally encoding a composite color television signal.

The technique of digitally encoding a television signal, and particularly a composite color television signal, is well known. Typically, sampling pulses are generated in synchronism with the color television burst signal, the sampling pulses having a repetition rate that is a multiple of the burst signal frequency. Each sample of the color television signal is encoded, or digitized, such as by pulse code modulation (PCM). Digitally encoded television signals are used in, for example, time base error correction devices, noise suppression devices, the addition of various special video effects, and the like. Digitized video signals are particularly advantageous for recording/reproduction, and also for special types of transmission.

In many television transmission systems, such as the NTSC system, the PAL system, and the like, color or chrominance information is represented by a particular phase of the chrominance subcarrier signal that is amplitude modulated with color information. Since the phase of the color subcarrier signal thus is used to represent color information, it is important that, when encoding the color television signal in digital form, the phase of the sampling pulses be accurately controlled. Undesired phase shifts, such as may be due to temperature drift, aging of the electrical components, and the like, may result in a phase error in the sampling pulse relative to the chrominance subcarrier signal which has the effect of distorting or interfering with the overall chrominance effect of the video picture which ultimately is reproduced from the digitized video signal.

To identify the aforementioned phase shifts, or errors, between the sampling pulses and the chrominance subcarrier signal, the instantaneous phase angle of the usual burst signal at the time of sampling is determined. If the phase angle then exhibited by the burst signal at the sampling time differs from a desired phase angle thereof, the phase of the sampling pulses may be adjusted accordingly. However, the number of samples which are needed to determine the sampled phase angle of the burst signal generally requires a relatively complicated calculating circuit, a memory device of high storage capacity, and necessitates a complex operation.

OBJECTS OF THE INVENTION

Therefore, it is an object of the present invention to provide a method and apparatus for detecting the phase at which a color television signal is sampled, which is relatively simple in operation and construction, and which avoids the aforenoted disadvantages.

Another object of this invention is to provide an improved method and apparatus for controlling the sampling of a color television signal in, for example, a digital encoder, so as to avoid the introduction of phase errors into the encoded signal.

A further object of this invention is to provide a method and apparatus for controlling the sampling phase at which a color television signal is sampled, whereby the digital implementation of this method and apparatus is relatively simple, requires advantageously low memory capacity and provides accurate phase control so as to minimize the introduction of phase errors into the sampled signal.

An additional object of this invention is to provide a method and apparatus for controlling the sampling of a color television signal when that signal is digitally encoded, so as to sample the television signal in proper phase relationship.

Yet another object of this invention is to provide a method and apparatus for detecting whether the burst signal of a color television signal is sampled in accordance with a predetermined phase relationship.

A still further object of this invention is to provide a method and apparatus for detecting the sampling phase of a color television signal, and particularly the burst signal thereof, to determine if the sampling occurs at a desired, predetermined phase angle, which method and apparatus find ready application in the digital encoding of the color television signal.

Various other objects, advantages and features of the present invention will become readily apparent from the ensuing detailed description.

SUMMARY OF THE INVENTION

In accordance with this invention, a method and apparatus are provided for determining if the burst signal of a color television signal is sampled at a predetermined phase angle thereof. The burst signal is sampled at a rate that is a multiple of the burst signal frequency, and a plurality of the actual sample levels are used to produce a theoretical sample level of the burst signal. This theoretical sample level represents a sample that would be obtained if the burst signal is sampled at its predetermined phase angle. A determination is made as to whether the actual sample of the burst signal is produced at its predetermined phase angle in response to the theoretical sample level and this actual sample level. In accordance with one aspect of the present invention, this determination is made by detecting the difference between the theoretical sample level and this actual sample level.

It is one feature of the present invention to adjust the sampling phase if the actual sampling phase, as determined above, differs from the predetermined phase angle. Advantageously, the present invention finds ready application in a system for digitizing a color television signal, where the color television signal is sampled, and each sample is digitally encoded.

As a specific feature of the present invention, the theoretical sample level is derived from two samples of the burst signal; and the determination as to whether the actual sampling phase of the burst signal coincides with the predetermined phase angle is made by detecting the difference between the theoretical sample level and a third sample of the burst signal.

As a still further specific feature of this invention, the number of bits needed to represent each burst signal sample when deriving the theoretical sample level may be reduced by subtracting from each burst sample a predetermined, constant level which approximates the pedestal level upon which the burst signal is superimposed.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
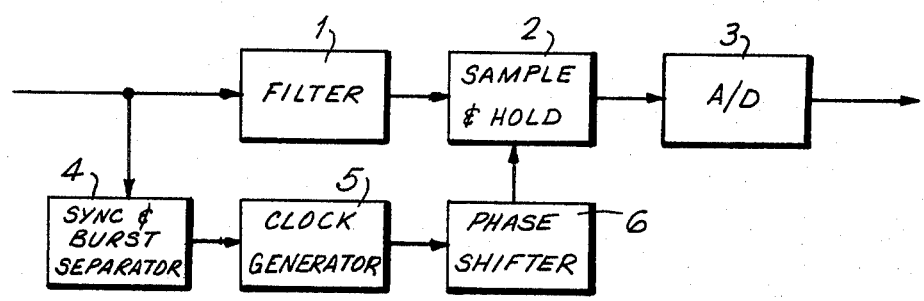
FIG. 1 is a block diagram of a television signal digital encoder wherein the present invention finds ready application.

Referring now to the drawings, wherein like reference numerals are used throughout, FIG. 1 is a block diagram representing a television signal digital encoder with which the present invention can be used. The encoder of FIG. 1 is comprised of a filter 1, a sample-and-hold circuit 2, an analog-to-digital (A/D) converter 3, a separator circuit 4 for separating synchronizing and burst signals from an incoming video signal, a clock generator 5 and a phase shift circuit 6. Filter 1 is coupled to an input terminal to receive a video signal, such as a composite color television signal of the type which includes the usual horizontal synchronizing signals, burst signal superimposed onto the pedestal level at the back porch of the horizontal synchronizing signal, and video information signal comprised, generally, of a chrominance subcarrier having different phases amplitude-modulated with chrominance information. As is conventional, the composite color television signal includes luminance and chrominance information. The output of filter 1 is coupled to sample-and-hold circuit 2 which is supplied with periodic sampling pulses having a repetition rate that is a multiple of the burst signal frequency. In one typical digital encoder, the entire composite color television signal, including both the synchronizing signals and the video information signals, is sampled by such sampling pulses. The output of sample-and-hold circuit 2 is coupled to A/D converter 3 which is adapted to encode each video sample into a corresponding multi-bit word. For example, A/D converter 3 may encode each sample as an 8-bit pulse code modulated (PCM) word.

The input terminal to which the composite color television signal is supplied also is coupled to separator circuit 4. This separator circuit may be of conventional construction to separate the horizontal synchronizing signal from the incoming video signal. Separator circuit 4 also may include a burst gate, or other comparable device, for separating the burst signal from the video signal.

As is known, this burst signal has a burst signal frequency equal to the frequency of the chrominance subcarrier $f_{sc}$ which is equal to about 3.58 MHz. The output of separator circuit 4 is coupled to clock generator 5 which is adapted to generate a clock signal in synchronism with the separated burst signal. The clock signal is a pulse signal having a repetition rate that is a multiple of the burst signal frequency. Typically, the repetition rate of the clock signal is $4f_{sc}$. These clock pulses are used as sampling pulses for sampling the composite color video signal. The output of clock generator 5 is supplied to sample-and-hold circuit 2 by phase shift circuit 6. This phase shift circuit is adapted to shift, or adjust, the phase of the sampling pulses.

In the encoder shown in FIG. 1, the incoming video signal is sampled at the sampling rate $4f_{sc}$. The sampling pulses which are supplied to sample-and-hold circuit 2 from clock generator 5 are phase-synchronized with the incoming burst signal and, generally, each sampling pulses "track" phase shifts in the burst signal. However, the actual phase of the sampling pulses relative to, for example, the phase of the chrominance subcarrier signal, may drift from the desired phase-lock relationship. This drift may be due to temperature changes in temperature-sensitive circuit components, changes in the operation of such components due to age, and the like. As a result of this phase shift in the sampling pulses, referred to herein as a change in the sampling phase, errors, such as phase errors, may be introduced into the sampled video signal, thereby introducing errors into the digitized color video signal. As a result of such phase errors, the color of the video picture which ultimately is reproduced from the encoded video signal may be erroneous.

Figure 2:
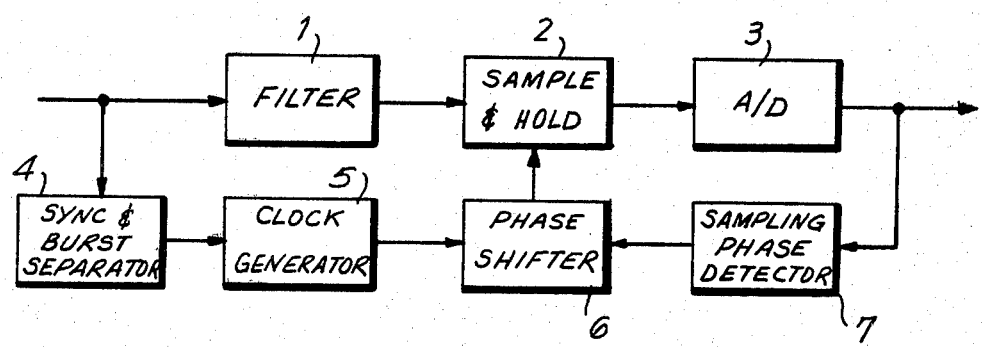
FIG. 2 is a block diagram similar to that of FIG. 1 and including a sampling phase detector which may be in accordance with the present invention.

FIG. 2 is a block diagram of a digital encoder, similar to that shown in FIG. 1, and includes a sampling phase detector 7. This sampling phase detector is coupled to the output of A/D converter 3 and is adapted to produce a control signal as a function of the aforementioned phase error. That is, if the phase of the sampling pulses generated by clock generator 5 and supplied to sample-and-hold circuit 2 drifts because of the aforementioned conditions, sampling phase detector 7 is adapted to detect this drift and supply a compensating control signal to phase shift circuit 6. This compensating control signal controls the phase shift circuit to adjust the phase of the sampling pulses so as to restore the desired, predetermined phase relationship thereof.

The sampling phase detector shown in FIG. 2 is adapted to receive the digitized samples of the burst sample, as produced by A/D converter 3, and to derive therefrom an indication, or representation, of the actual phase angle at which the burst signal is sampled. When the sampling pulses exhibit the proper phase relationship with respect to the burst signal, the burst signal will be sampled at a predetermined phase angle thereof. However, if the determined sampled phase of the burst signal differs from this predetermined phase angle, sampling phase detector 7 controls phase shift circuit 6 to shift the phase of the sampling pulses so as to bring them into coincidence with the predetermined burst phase angle.

Figure 3:
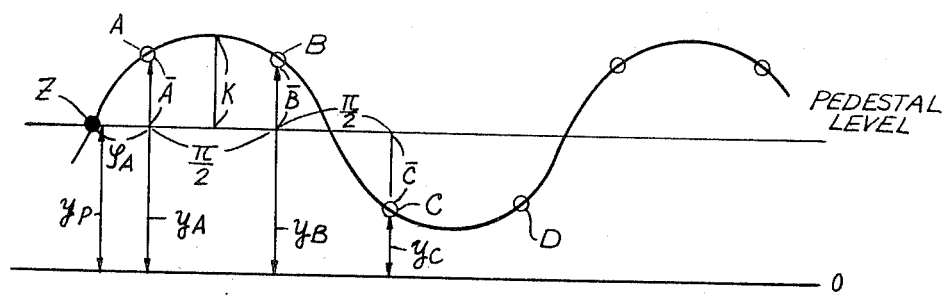
FIGS. 3-5 are waveform diagrams representing the sampling of a burst signal, which diagrams are useful in understanding the present invention.

One technique by which sampling phase detector 7 may operate in order to detect the actual phase of the burst signal which is sampled, and thus sense a phase error in the sampling pulses, now will be described with reference to the waveform shown in FIG. 3. This waveform represents a cycle of the burst signal superimposed on the usual pedestal level having a magnitude represented as $y_p$. For convenience, FIG. 3 is an analog representation of the digitized samples of the burst signal which are produced at the output of A/D converter 3. If it is assumed that the sampling pulses exhibit the sampling rate $4f_{sc}$, then the burst signal will be sampled at points A, B, C and D, respectively. It is appreciated that successive sampling points A-D are separated from each other by 90° ($\pi/2$). Let it be assumed that the burst signal crosses the pedestal level at point Z, this point being the reference crossing point at which the phase angle of the burst signal is equal to 0°. Now, if the phase angle of the burst signal at sampling point A is assumed to be $\xi_A$, then the phase angle $\xi_B$ of the burst signal at sampling point B and the phase angle $\xi_C$ of the burst signal at sampling point C may be represented as:

$$\xi_B = \xi_A + \pi/2 \quad (1)$$

$$\xi_C = \xi_A + \pi \quad (2)$$

The sample levels of the burst signal at sampling points A, B and C may be represented as $y_A$, $y_B$ and $y_C$, respectively. These are the sample levels with respect to a zero reference level. If the amplitude of the burst signal with respect to the pedestal level is represented as K, then the amplitude of the burst signal, relative to the pedestal level, at sampling points A, B and C may be designated as $\overline{A}$, $\overline{B}$ and $\overline{C}$, respectively, and each of these sampled amplitudes may be expressed as:

$$\overline{A} = y_A - y_P = K \sin \zeta_A \quad (3)$$

$$\overline{B} = y_B - y_P = K \sin \zeta_B = K \sin\left(\zeta_A + \frac{\pi}{2}\right) \quad (4)$$

$$\overline{C} = y_C - y_P = K \sin \zeta_C = K \sin(\zeta_A + \pi) \quad (5)$$

Equation (4) may be rewritten as:

$$\overline{B} = y_B - y_P = K \cos \xi_A \quad (6)$$

If equation (3) is divided by equation (6), the resultant may be expressed as:

$$\frac{y_A - y_P}{y_B - y_P} = \tan \zeta_A \quad (7)$$

Equations (3) and (5) may be added, and the sum solved for the pedestal level $y_p$:

$$y_P = \frac{y_A + y_C}{2} \quad (8)$$

When equation (8) is inserted into equation (7), the phase angle $\xi_A$ may be determined as:

$$\tan \zeta_A = \frac{y_A - y_C}{2y_B - (y_A + y_C)} \quad (9A)$$

$$\zeta_A = \tan^{-1} \frac{y_A - y_C}{2y_B - (y_A + y_C)} \quad (9B)$$

Therefore, it is seen that the actual phase angle of the burst signal at which it is sampled, that is, the sampling phase, may be determined from sampled levels $y_A$, $y_B$ and $y_C$. If each sample is represented by a 6- or 7-bit word, it is appreciated that the implementation of equations (9A) and (9B) is relatively complex. That is, if these equations are implemented by means of, for example, an arithmetic logic unit, the construction of such a unit would be relatively complicated; and its operation likewise would be complex. Alternatively, if equations (9A) and (9B) are implemented by utilizing each sample $y_A$, $y_B$ and $y_C$ as a portion of an address for addressing a memory device in which different values of phase angle $\xi_A$ are stored, the requisite memory capacity would be quite high. Also, a relatively complicated scheme would be needed to formulate the appropriate addresses in response to these samples. Thus, the foregoing technique for determining the actual phase angle $\xi_A$ at which the burst signal is sampled, and thus, for determining the phase relationship of the sampling pulses, is less than satisfactory.

Figure 4:
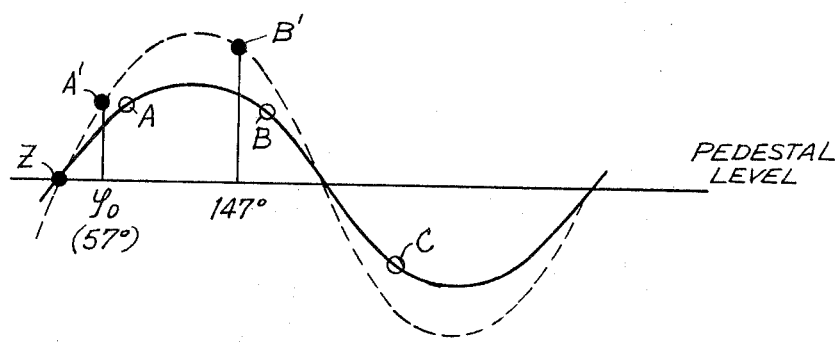

The present invention proceeds upon the principle which can be explained initially with reference to the waveform shown in FIG. 4. The solid curve of FIG. 4 represents one cycle of the burst signal superimposed onto the usual pedestal level. Points A, B and C represent the sampling points of the burst signal, and it is assumed that the burst signal is sampled at the rate 4 $f_{sc}$. From equations (3) and (6) above, the amplitude of point B relative to the pedestal level, may be expressed as:

$$\overline{B} = (\overline{A}/\tan \xi_A) \quad (10)$$

Similarly, from equations (3) and (8) above, the amplitude at point A may be expressed as:

$$\overline{A} = (y_A - y_C/2) \quad (11)$$

Equations (10) and (11) may be combined such that the amplitude at point B may be expressed as:

$$\overline{B} = \frac{y_A - y_C}{2 \tan \zeta_A} \quad (12)$$

In FIG. 4, sample point A represents the actual point at which the burst signal is sampled. Let it be assumed that the correctly phased sample point would occur at phase angle $\xi_o$; but that the actual sample point A occurs at phase angle $\xi_A$. If the sampled amplitude A had been obtained at phase angle $\xi_o$, the resultant burst signal would have the waveform shown by the broken line in FIG. 4. That is, point A' corresponds to the amplitude obtained at sample A, but represents that amplitude at angle $\xi_o$ on the burst signal waveform shown by the broken curve. It is assumed that this proper, or reference phase angle $\xi_o$ of the burst signal at which sample A' would be obtained is equal to 57°. It is appreciated that this 57° phase angle corresponds to the phase difference between the usual axis of the burst signal and the axis for the I subcarrier in the I-Q color transmission system.

For the purpose of the present explanation, it will be appreciated that the broken curve shown in FIG. 4 represents the "theoretical" burst signal whose amplitude A' at the predetermined phase angle $\xi_o$ equals the amplitude of the actually sampled point A of the actual burst signal. Point A' may be considered a theoretical sample level of the theoretical burst signal. Since the burst signal is sampled at 90° intervals, it is appreciated that point B' on the theoretical burst signal waveform occurs at the phase angle $$\left(\zeta_o + \frac{\pi}{2}\right),$$

or 147°. This additional point B' also is referred to as the theoretical sample level; and it is seen that, if the theoretical burst signal represented by the broken curve is sampled at point A', then it also would be sampled at point B'.

From FIG. 4, it is seen that the actual burst signal is sampled at point A which lags the predetermined phase angle $\xi_o$ at which this burst signal should be sampled. If the actual burst signal had been sampled at the the predetermined phase angle thereof $\xi_o$, then the theoretical and actual burst signal waveforms would coincide. If, however, the actual burst signal had been sampled at point A in advance, or leading, the predetermined phase angle $\xi_o$, the actual burst signal waveform would appear as being greater than the theoretical burst signal waveform.

If the amplitude at theoretical sample point A', relative to the pedestal level, is represented as $\overline{A'}$ then the amplitude at the theoretical sample point B', relative to the pedestal level, may be represented as $\overline{B'}$. Accordingly, equation (10) above, may be rewritten, for the theoretical sample points A' and B', as:

$$\overline{B'} = \frac{\overline{A'}}{\tan \zeta_o} = \frac{y_A - y_C}{2 \tan \zeta_o} \quad (13)$$

The sampling phase $\xi_A$ of the actual sample point A, that is the phase angle of the actual burst signal at sample point A, may be determined by comparing the amplitude of, for example, the actual sample point B to the amplitude of the theoretical sample point B'. If equation (12) is divided by equation (13), the result is:

$$\frac{\overline{B}}{\overline{B'}} = \frac{\tan \zeta_o}{\tan \zeta_A} \quad (14)$$

$$\tan \zeta_A = \frac{\overline{B'}}{\overline{B}} \cdot \tan \zeta_o \quad (15)$$

It is appreciated, therefore, that the phase angle of the actual sample point A of the burst signal is a function of only two variables: $y_A$ and $y_C$. Since the phase angle $\xi_o$ is a constant, predetermined phase angle, $\tan \xi_o$ likewise is a constant. Thus, from equation (15) it will be seen that the determination, or calculation, of the phase angle $\xi_A$ at which the burst signal is sampled, is far simpler than the determination, or calculation, of this phase angle as derived by equation (9). Hence, the implementation of the present invention requires a less complicated arithmetic unit; and if equation (15) is to be implemented by, for example, a memory device having plural locations which are addressed by the combination of amplitudes $\overline{B}$ and $\overline{B'}$ for storing representations of various different phase angles, the memory capacity of such a memory device would be far less than is needed to implement equation (9A).

When sampling phase detector 7 of FIG. 2 is constructed so as to carry out the present invention, the phase of the sampling pulses to sample-and-hold circuit 2 is adjusted such that the burst signal is sampled at its predetermined phase angle $\xi_o$. If the phase angle $\xi_A$ at which the burst signal actually is sampled differs from the predetermined phase angle $\xi_o$, then the amplitude of the actual sample point B will differ from the amplitude of the theoretical sample point B'. This difference can be attained merely by comparing the amplitude of the theoretical sample point, calculated in accordance with equation (13), with the amplitude of the actual sample point B, the latter being an actual sample level. Any difference between these compared amplitudes indicates a phase error, and a control signal that is a function of this difference may be utilized to adjust the actual phase of the sampling pulses until this difference is reduced to a null value. Thus, when $\overline{B} = \overline{B'}$, the sampling phase exhibits its proper, predetermined phase relationship with respect to the burst signal. Although this sampling phase control is relatively delayed such that the overall sampling phase control circuitry exhibits a low speed of response, this is not a disadvantage, especially since the digital encoding system with which the present invention is used need not follow time base errors, or jitter, in the video signal. That is, if the color television signal supplied to the encoder shown in FIG. 2 is produced by a video camera or video signal generator, there generally will be no deleterious jitter in that video signal. Nevertheless, and as will be described below with respect to the embodiment shown in FIG. 6, the present invention proceeds with an adequate speed of response.

Figure 5:
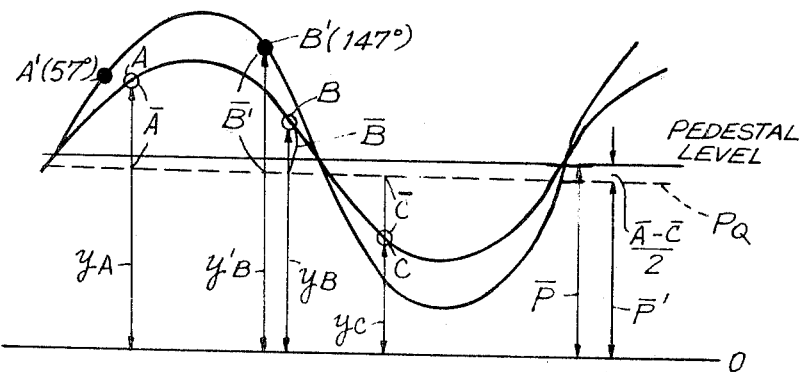

FIG. 5 represents the actual and theoretical burst signal waveforms drawn previously in FIG. 4, and also illustrates the sample levels which are obtained at sample points A, B and C, respectively, as well as the theoretical sample level $y'_B$ representing theoretical sample point B'. FIG. 5 also illustrates the pedestal level upon which the burst signal is superimposed, and a predetermined, constant level $P_Q$ which approximates, but is not necessarily equal to, the pedestal level. Amplitudes A, B, C and theoretical amplitude B' are the respective amplitudes of sample points $\overline{A}, \overline{B}$ and $\overline{C}$, and theoretical sample point B', all with respect to the predetermined level $P_Q$.

From equation (13), it is recalled that the amplitude $\overline{B'}$ at theoretical sample point B', relative to the pedestal level, is a function merely of the actual sample levels $y_A$ and $y_C$ obtained at sample points A and C, respectively. The amplitude $\overline{B}$, relative to the pedestal level, is readily obtained from the actual sample level $y_B$. It is appreciated that, in practice, the actual magnitude of the pedestal level may vary. Accordingly, to simplify the circuitry which is used to implement the present invention, and also to reduce the memory capacity of the digital implementation of this invention, the actual sample levels $y_A$, $y_B$ and $y_C$ of the burst signal are reduced by the predetermined amount $\overline{P'}$ where $\overline{P'}$ is equal to the magnitude of the predetermined constant level $P_Q$. Thus, the amplitude $\overline{B'}$ of the theoretical sample point B' is referenced with respect to the predetermined constant level $P_Q$. Likewise, the amplitudes $\overline{A}, \overline{B}$ and $\overline{C}$ of the actual sample points A, B and C also are referenced to this predetermined level $P_Q$. Since this predetermined level $P_Q$ remains constant, the usual 7- or 8-bit digitized version of sampled levels $y_A$, $y_B$ and $y_C$ may be reduced to, for example, less than 5 bits because the constant level $P_Q$ may be subtracted from the 7- or 8-bit digitized sample level. By reducing the number of bits which is needed to represent the sampled levels, the complexity of the implementing circuitry may be substantially reduced. Likewise, memory devices may be used with comparatively smaller memory capacity.

If the actual level of the pedestal level is represented as $\overline{P}$, then the theoretical sample level $y'_B$ may be represented by adding this pedestal level P to equation (13). This results in :

$$y'_B = \frac{y_A - y_C}{2 \tan \zeta_o} + \overline{P} \quad (16A)$$

The numerator of the first term in equation (16A) remains unmodified if the level $\overline{P'}$ is both added and subtracted, resulting in:

$$y'_B = \frac{y_A - \overline{P'} + \overline{P'} - y_C}{2 \tan \zeta_o} + \overline{P} \quad (16B)$$

As mentioned above, and as shown in FIG. 5, the amplitude $\overline{A}$ of sample point A, relative to the predetermined level $P_Q$ is equal to $y_A - \overline{P'}$; and the amplitude $\overline{C}$ at sample point C, relative to the predetermined level $P_Q$, is equal to $\overline{P'} - y_C$. Also, the pedestal level $\overline{P}$ is equal to $$\overline{P'} + \frac{\overline{A} - \overline{C}}{2}.$$

Consequently, equation (16B) may be rewritten as:

$$y'_B = \frac{\overline{A} + \overline{C}}{2 \tan \zeta_o} + \frac{\overline{A} - \overline{C}}{2} + \overline{P'} \quad (16C)$$

Thus, it is seen that the theoretical sample level $y'_B$ may be determined, or calculated, from the variable amplitudes $\overline{A}$ and $\overline{C}$. From equation (16C), the remaining terms, such as the predetermined phase angle $\zeta_o$ and the predetermined level $\overline{P'}$, all are constant and remain fixed. Of course, amplitude $\overline{A}$ may be obtained by subtracting the predetermined, constant level $\overline{P'}$ from the actual sample level $y_A$. Likewise, the amplitude $\overline{C}$ may be obtained merely by subtracting the actual sample level $y_C$ from the predetermined, constant level $\overline{P'}$. Consequently, the theoretical sample level $y'_B$ may be derived from the actual sample levels $y_A$ and $y_C$. Once this theoretical sample level $y'_B$ is ascertained, any phase error in the sampling pulses may be detected merely by comparing this theoretical sample level $y'_B$ to the actual sample level $y_B$. Any differences therebetween represent a sampling phase error. In accordance with the present invention, this sampling phase error is reduced to a null value merely by adjusting the phase of the sampling pulses until the difference between the actual and theoretical sampling levels $y_B$ and $y'_B$, respectively, is minimized or, preferably, eliminated.

Figure 6:
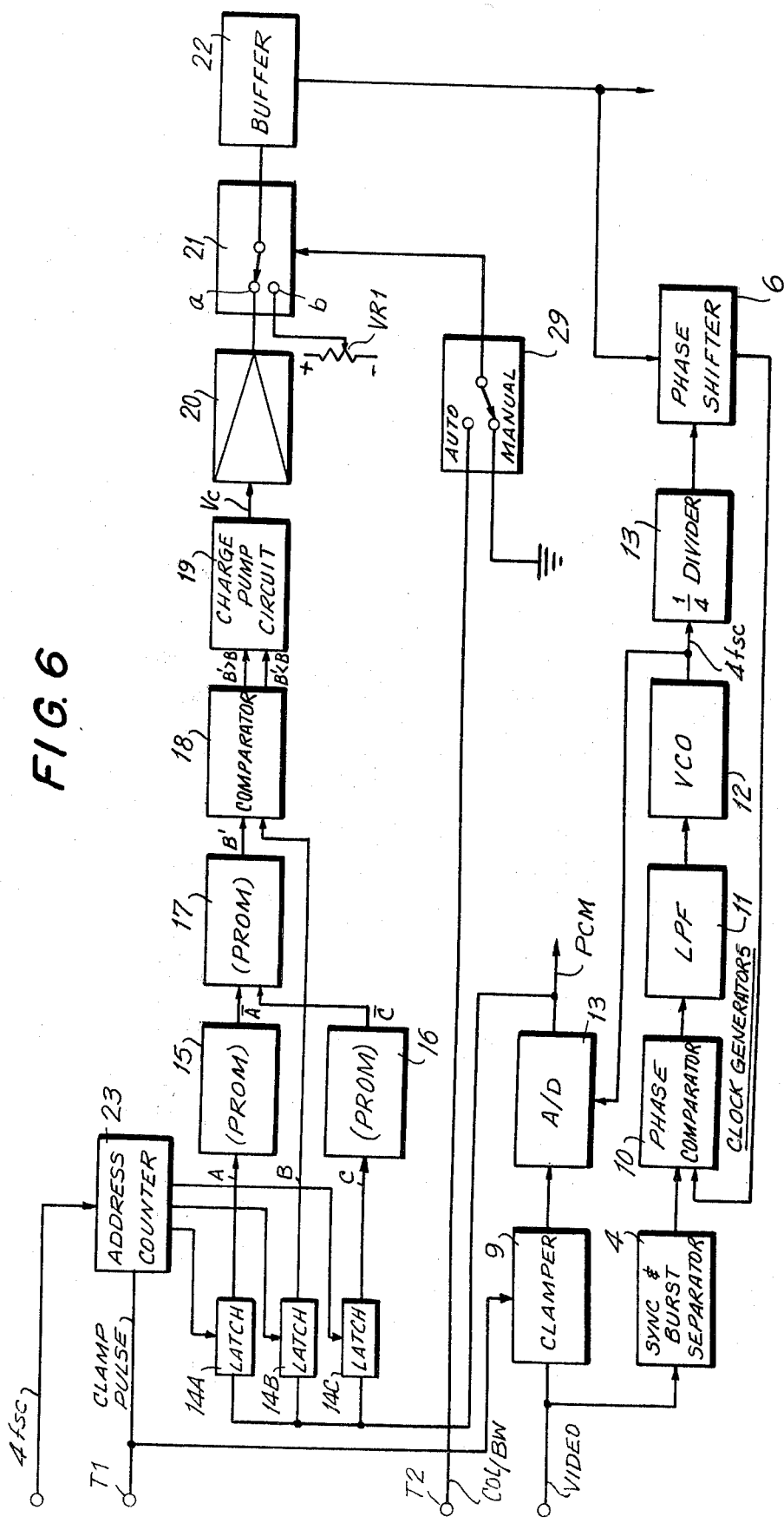
FIG. 6 is a detailed block diagram of a preferred embodiment of the present invention.

One embodiment of a sampling phase detector in accordance with the present invention is illustrated in FIG. 6. This sampling phase detector is shown in combination with a digital encoder with which it may be used. The digital encoder is comprised of a clamping circuit 9 and an A/D converter 13, this A/D converter including a sample-and-hold circuit as well as a multi-bit encoder. The digital encoding circuit also includes separator circuit 4 and clock generator 5. The separator circuit may be substantially the same as the aforedescribed separator circuit; and clock generator 5 is illustrated in greater detail, and will be described below.

The sampling phase detector is comprised of latch circuits 14A, 14B and 14C, an address counter 23, storage devices 15, 16 and 17, a level comparator 18, a charge-pump circuit 19 and a buffer amplifier 22. Latch circuits 14A, 14B and 14C each may be comprised of, for example, a conventional 8-bit latch circuit. The inputs of these latch circuits are connected in common to the output of A/D converter 13 and are adapted to receive digitally encoded video signals from the A/D converter. Each latch circuit includes an enable input coupled to a respective output of address counter 23. This address counter is supplied with the sampling pulses whose sampling rate is, for example, 4 $f_{sc}$. The address counter also is coupled to an input terminal T1 adapted to receive the usual clamping pulse normally provided in, for example, a television receiver to establish a proper reference level for the video signal. This clamping pulse also is coupled from input terminal T1 to clamping circuit 9. Address counter 23 is adapted to be enabled by the clamping pulse so as to count the sampling pulses supplied thereto and produce an enabling signal at a respective one of its outputs. For example, in response to the first sampling pulse, an enable signal is produced at the first output of the address counter. In response to the second sampling pulse, an enable signal is produced at the second output of the address counter. In response to the third sampling pulse, an enable signal is produced at the third output of this address counter. As illustrated, the first, second and third outputs of address counter 23 are coupled to latch circuits 14A, 14B and 14C, respectively. These latch circuits may be designated the A, B and C latch circuits, respectively.

The outputs of latch circuits 14A and 14C are coupled to storage circuits 15 and 16, respectively. Each of these storage circuits may comprise a programmable read only memory (PROM) adapted to be addressed by the samples supplied thereto from its associated latch circuit and read out therefrom a digital signal stored at an addressed location. More particularly, PROM 15 is adapted to subtract a digital signal corresponding to the aforementioned predetermined level $\overline{P'}$ from the 8-bit sample supplied thereto by latch circuit 14A. Likewise, PROM 16 is adapted to subtract the predetermined level $\overline{P'}$ from the 8-bit sample supplied thereto by latch circuit 14C. In this regard, each 8-bit sample may be used to address a corresponding location of the PROM in which is stored a digital signal comprised of less than 5 bits and corresponding to the 8 bit sample less the predetermined level $\overline{P'}$. Thus, PROM 15 is adapted to produce an output signal representing the amplitude $\overline{A}$ and PROM 16 is adapted to produce a signal representing the amplitude $\overline{C}$.

The outputs of PROMS 15 and 16 are supplied to a storage device 17, which may also comprise a PROM. This storage device is adapted to be addressed in response to the digital signals $\overline{A}$ and $\overline{C}$ produced by PROMS 15 and 16, respectively. PROM 17 stores, at each address location therein, a multi-bit representation, such as an 8-bit digital signal, representing the theoretical sample level B', discussed above. That is, for every combination of signals $\overline{A}$ and $\overline{C}$, PROM 17 stores a corresponding theoretical sample level B'. This theoretical sample level, discussed above with respect to FIGS. 4 and 5, also may be referred to herein as a "calculated" sample level in view of the fact that this theoretical, or calculated, sample level is derived, or calculated, from equations (16A)-(16C).

The output of PROM 17 is supplied as one input to level comparator 18. The other input of this level comparator is coupled to latch circuit 14B to receive the sample stored in this latch circuit. As will be explained below, the sample stored in latch circuit 14B corresponds to actual sample level $y_B$, that is, the level of the burst signal at sample point B. Level comparator 18 is adapted to compare the theoretical sample level B' to the actual sample level B and to determine any difference therebetween. In the event that the theoretical sample level exceeds the actual sample level (B'>B), a first output signal is produced. Conversely, if the theoretical sample level is less than the actual sample level (B'<B), then comparator 18 produces a second output signal. The output signals produced by level comparator 18 are coupled to charge-pump circuit 19.

The charge-pump circuit is described in greater detail hereinbelow with respect to FIG. 7. It will be sufficient, for the present discussion, merely to recognize that the charge-pump circuit includes a capacitor which is selectively charged in response to the first signal produced by level comparator 18, and is discharged in response to the second signal produced by the level comparator. The charge-pump circuit thus is adapted to produce an output signal, or voltage, $V_C$ representing the cumulative charge on the capacitor therein. More particularly, this charge, and thus, the control voltage $V_C$, is changed by a first incremental amount in response to the first output signal produced by comparator 18. Conversely, the control voltage $V_C$ is changed by an incremental amount in the opposite direction in response to the second output signal produced by the level comparator. For example, the control voltage may be increased in the event that the theoretical sample level exceeds the actual sample level, and it may be decreased in the event that the theoretical sample level is less than the actual sample level. The output of charge-pump circuit 19 is coupled via an amplifier 20 and a switching circuit 21 through buffer amplifier 22 to phase shift circuit 6.

Switching circuit 21 is controlled such that it assumes a first condition when a color video signal is supplied to the illustrated apparatus, and it assumes a second condition when a monochrome, or black-and-white, video signal is supplied to the apparatus. This switching circuit is illustrated as an electro-mechanical switch having a movable contact which selectively engages either fixed contact a or fixed contact b. When contact a is engaged, switching circuit 21 exhibits its first condition to couple the control voltage $V_C$ to buffer amplifier 22 and, thence, to phase shift circuit 6. When contact b is engaged, switching circuit 21 couples a reference voltage produced by a variable resistor VR1 through buffer amplifier 22 to phase shift circuit 6. It is appreciated that, when a monochrome video is digitally encoded, it is of little consequence to control the phase of the sampling pulse. Hence, it is sufficient to supply a constant reference potential to the phase shift circuit such that the phase of the sampling pulses is not varied.

Switching circuit 21 includes a control input coupled to a change-over switch 29. This change-over switch is illustrated as an electro-mechanical switch having a movable contact selectively engageable with either an "auto" contact or a "manual" contact thereof. The "manual" contact is coupled to ground such that, when it is engaged, change-over switch 29 supplies ground potential to the control input of switching circuit 21. This ground potential controls the switching circuit to engage contact b. However, when the movable contact of change-over switch 29 engages its "auto" contact, switching circuit 21 is controlled in response to a color/black-and-white control signal that may be supplied to input terminal $T_2$. This input terminal is coupled to the "auto" contact of change-over switch 29. In the event that a color television signal is supplied to the illustrated apparatus, a relatively higher voltage, such as a binary "1" level, is applied to input terminal $T_2$ and coupled to the control input of switching circuit 21 by change-over switch 29. This binary "1" level controls the switching circuit to engage contact a, thereby supplying the control voltage $V_C$ to phase-shift circuit 6. However, when the video signal supplied to the illustrated apparatus is a black-and-white television signal, a binary "0" level, which may be equal to ground potential, is supplied to input terminal $T_2$ and coupled, via change-over switch 29, to switching circuit 21. It is appreciated that this binary "0" level controls the switching circuit to engage contact b, thereby coupling a constant voltage to the phase shift circuit. The color/black-and-white control signal may be derived by, for example, sensing the presence or absence of a burst signal in the television signal.

Clock generator 5 is comprised of a phase comparator 10, a low pass filter 11, a voltage controlled oscillator (VCO) 12 and a frequency divider 13. VCO 12 is adapted to generate a local oscillating signal whose frequency is equal to the sampling frequency 4 $f_{sc}$. It is seen that the output of VCO 12 is coupled to A/D converter 13 to supply sampling pulses thereto. The output of VCO 12 also is frequency-divided by frequency-divider 13. The dividing ratio of frequency-divider 13 is equal to 4 such that the frequency divider produces a frequency-divided local oscillating signal whose frequency is equal to the burst signal frequency $f_{sc}$. This frequency-divided local oscillating signal is supplied through phase shift circuit 6 to one input of phase comparator 10. The other input of this phase comparator is coupled to separator circuit 4 and is adapted to receive the burst signal which is included in the composite color television signal. Any phase difference between the phase-shifted, frequency-divided local oscillating signal and the received burst signal appears as a phase error. This phase error is filtered by low pass filter 11 and supplied as a control signal to VCO 12. Thus, depending upon any phase error sensed by phase comparator 10, the phase of the sampling pulses generated by VCO 12 is adjusted in a direction so as to reduce this phase error to a null value.

The manner in which the apparatus illustrated in FIG. 6 operates now will be briefly described. Let it be assumed that the incoming video signal is a conventional composite color television signal. This video signal is clamped to the appropriate reference level by clamping circuit 9, and the clamped video signal then is encoded in digital form by A/D converter 13. It is appreciated that the burst signal which accompanies this composite color television signal likewise is digitally encoded. In particular, the video signal (including the burst signal) is sampled by the sampling pulses generated by VCO 12, and each sampled level of the video signal is encoded in, for example, PCM code. As one example, each encoded sample is represented as and 8-bit signal. Each 8-bit sample is supplied in common to latch circuits 14A, 14B and 14C.

The sampling pulses which are supplied to A/D converter 13 by VCO 12 also are supplied to address counter 23. This address counter is triggered in response to the usual clamping pulse to count the sampling pulses and produce a corresponding address in response thereto. It is appreciated, therefore, that address counter 23 is synchronized with the incoming video signal such that when sampling point A of the burst signal is obtained, latch circuit 14A is enabled. At this time, A/D converter 13 produces the encoded sample level $y_A$ and this encoded sample level is stored in latch circuit 14A. Likewise, when A/D converter 13 produces encoded sample levels $y_B$ and $y_C$ of the burst signal, latch circuits 14B and 14C are enabled to store respective ones of these encoded sample levels.

In the illustrated embodiment, the encoded sample level $y_A$, stored in latch circuit 14A, addresses PROM 15 so as to be reduced by the predetermined level $\overline{P'}$, thereby producing a digital representation of amplitude $\overline{A}$, shown in FIG. 5. As mentioned above, this digital representation of the amplitude $\overline{A}$ may be formed of less than 5 bits. In similar manner, the encoded sample level $y_C$, stored in latch circuit 14C, addresses PROM 16 so as to read out therefrom the digital representation of amplitude $\overline{C}$. The digital representations of amplitudes $\overline{A}$ and $\overline{C}$ are utilized to form an appropriate address for PROM 17, from which the corresponding digital signal representing the theoretical sample level $y'_B$ is read. It may be appreciated that this theoretical sample level corresponds to the aforenoted expressions set out in equations (16A) or (16B) or (16C). Thus, level comparator 18 is supplied with a digital signal representing the theoretical sample level $y'_B$ of theoretical sampling point B' (FIG. 5).

Comparator 18 functions in the manner described hereinabove to compare the actual sample level $y_B$, stored in latch circuit 14B, to the theoretical sample level $y'_B$. If a difference between these sample levels is detected, charge-pump circuit 19 is selectively charged or discharged so as to correspondingly change the control voltage $V_C$ by an incremental amount. This change in the control voltage is supplied via amplifier 20, switching circuit 21 and buffer amplifier 22 to phase-shift circuit 6. If the actual phase angle at which the burst signal is sampled differs from the predetermined phase $\xi_o$ (for example, $\xi_o = 57°$), the theoretical sample level $y'_B$ will differ from the actual sample level $y_B$. Hence, the control voltage $V_C$ is incrementally changed so as to shift the phase of the frequency-divided local oscillating signal supplied through phase shift circuit 6. This shift in the phase of the frequency-divided local oscillating signal will result in a phase error with respect to the separated burst signal. This phase error is supplied to VCO 12 to change the phase of the sampling pulses generated thereby. If this change in the phase of the sampling pulse still does not result in the proper predetermined phase relationship thereof, that is, if the burst signal still is not sampled at its predetermined phase angle $\xi_o$, the foregoing operation is repeated until this predetermined phase relationship is attained. It is appreciated that, when this proper, predetermined phase relationship is attained, that is, when the burst signal is sampled at its phase angle $\xi_o$, the theoretical sample level $y'_B$, which is read out from PROM 17, will be equal to the actual sample level $y_B$ which is stored in latch circuit 14B. At that time, the output voltage $V_C$ produced by charge-pump circuit 19 remains constant.

Figure 7:
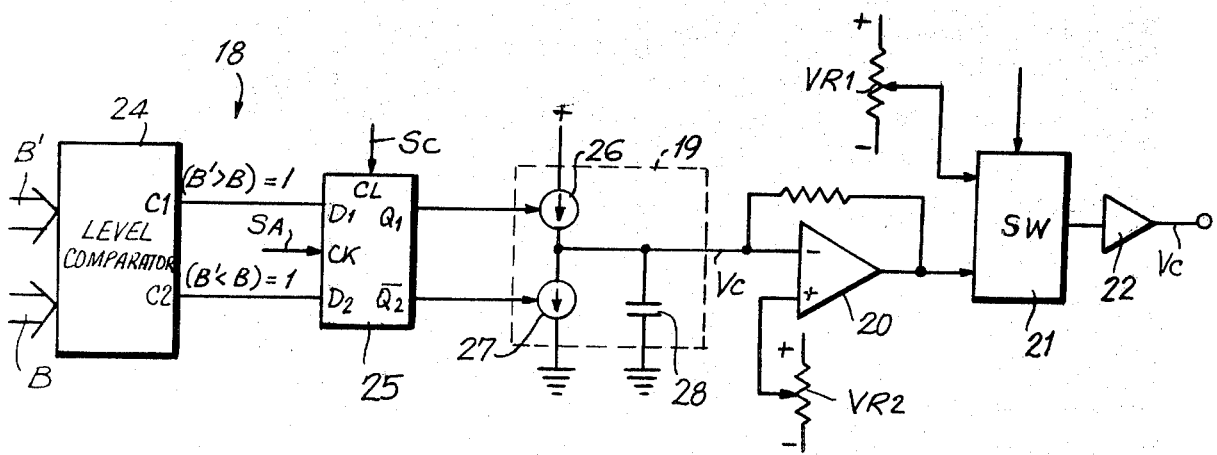
FIG. 7 is a schematic diagram of a portion of the apparatus shown in FIG. 6.

FIG. 7 is a schematic diagram illustrating level comparator 18 and charge-pump circuit 19 in greater detail. In FIG. 7, the level comparator is comprised of a comparator circuit 24 and a dual-state latch circuit or flip-flop 25. Charge-pump circuit 19 is comprised of a capacitor 28 and constant current sources 26 and 27.

Comparator 24 is supplied with the digital representation of the theoretical sample level, designated B', and also with the digital representation of the actual sample level, designated B. For example, each digital representation may be comprised of 8 bits. Comparator 24 includes outputs $C_1$ and $C_2$. If the theoretical sample level exceeds the actual sample level (B' > B), a binary "1" is produced at output $C_1$ and a binary "0" is produced at output $C_2$. Conversely, if the theoretical sample level is less than the actual sample level, a binary "1" is produced at output $C_2$ and a binary "0" is produced at output $C_1$. In the event that the theoretical and actual sample levels are substantially equal to each other, a binary "0" is produced at each of outputs $C_1$ and $C_2$.

Dual-state latch circuit 25 includes data inputs $D_1$ and $D_2$ coupled to outputs $C_1$ and $C_2$, respectively, of comparator circuit 24. The dual-state latch circuit also includes a clock input CK adapted to receive the sampling pulse which is produced when sampling point A of the burst signal is obtained. This phase of the sampling pulse is designated $S_A$. The dual-state latch circuit also includes a clear input CL adapted to receive the $S_C$ phase of the sampling pulse, that is, the sampling pulse which is produced to obtained sampling point C of the burst signal. It will be appreciated that, if a binary "1" is supplied to input $D_1$ of dual-state latch circuit 25, a binary "1" is produced at output $Q_1$ in response to sampling pulse $S_A$. At this time, a binary "0" is produced at the $\overline{Q_2}$ output of the latch circuit. If a binary "1" is supplied to the $D_2$ input of dual-state latch circuit 25, a binary "1" is produced at the $\overline{Q_2}$ output in response to the sampling pulse $S_A$. If inputs $D_1$ and $D_2$ both are supplied with a binary "0", a binary "0" is produced at each of outputs $Q_1$ and $\overline{Q_2}$ of the dual-state latch circuit in response to sampling pulse $S_A$. This latch circuit is cleared when the sampling pulse $S_C$ is produced. It is appreciated that, when dual-state latch circuit 25 is cleared, a binary "0" is produced at each of its outputs $Q_1$ and $\overline{Q_2}$.

The outputs $Q_1$ and $\overline{Q_2}$ of dual-state latch circuit 25 are coupled to current sources 26 and 27, respectively, and are adapted to trigger the current sources in response to a binary "1" supplied thereto. If latch circuit 25 is set such that the $Q_1$ output produces a binary "1", current source 26 is activated to supply charging current to capacitor 28. Conversely, if latch circuit 25 is reset, the $\overline{Q_2}$ output produces a binary "1" to activate current source 27 which, in turn, supplies a discharge current to capacitor 28. It may be appreciated, therefore, that the capacitor is selectively charged or discharged for the duration extending from sampling pulse $S_A$ to sampling pulse $S_C$ during each burst signal cycle. Of course, if latch circuit 25 is cleared such that a binary "0" is produced at each output thereof, neither current source 26 nor current source 27 is activated during the burst signal cycle. In that event, the voltage across capacitor 28 remains constant and is neither charged nor discharged.

The voltage across capacitor 28 is illustrated in FIG. 7 as corresponding to control voltage $V_C$. This control voltage is supplied through gain-adjusted amplifier 20 to switching circuit 21 and, thence, to buffer amplifier 22. A variable resistor VR2 is coupled to gain-adjusted amplifier 20 so as to permit adjustment of the gain thereof.

It will be recognized that charge-pump circuit 19 serves to change the control voltage $V_C$ by an incremental amount whenever the theoretical sample level B' differs from the actual sample level B of the burst signal. The charge-pump circuit may be replaced by an equivalent device, such as an up/down counter which is controlled to count a predetermined number of clock pulses in the upward direction when B'>B, and to count the same predetermined number of clock pulses in the downward direction when B'<B. The count of this up/down counter then may be converted by, for example, a digital-to-analog converter to produce the control voltage $V_C$.

In the foregoing discussion of the video signal digital encoder and sampling phase detector, it has been assumed that the sampling pulses are generated at the repetition rate of $4 f_{sc}$. Preferably, the repetition rate of the sampling pulses is equal to an even multiple of twice the burst signal frequency (e.g $4 f_{sc}$, $8 f_{sc}$, $12 f_{sc}$...). Alternatively, the sampling pulse repetition rate may be equal to $3 f_{sc}$. Nevertheless, the foregoing teachings are equally applicable to obtain the theoretical sample level from a plurality of actual sample levels. With a sampling repetition rate of $3 f_{sc}$, equations (12) and (13) above may be rewritten as:

$$\overline{B} = \frac{\overline{A}}{2}\left(\frac{\sqrt{3}}{\tan \zeta_A} - 1\right) \quad (17)$$

$$\overline{B'} = \frac{\overline{A}}{2}\left(\frac{\sqrt{3}}{\tan \zeta_o} - 1\right) \quad (18)$$

and equation (11) may be rewritten as:

$$\overline{A} = y_A - \frac{y_A + y_B + y_C}{3} \quad (19)$$

Of course, with this sampling repetition rate of $3 f_{sc}$, the sampling phase error may be determined by comparing the theoretical sample level $y'_B$ with the actual sample $y_B$; and the detected sampling phase error then may be used to control the phase of the sampling pulses generated by clock generator 5 in the manner discussed above.

While the present invention has been particularly shown and described with reference to a preferred embodiment, various changes and modifications in form and details may be made without departing from the spirit and scope of the invention. For example, the theoretical sample level $\overline{B'}$ may be obtained by implementing equations (16A), (16B) or (16C) by means of an arithmetic logic unit. In such an implementation, the arithmetic logic unit operates to calculate the difference between actual sample levels $y_A$ and $y_C$, and to multiply this difference $(y_A - y_C)$ by the predetermined constant $$\frac{1}{2 \tan \zeta_o}.$$

The arithmetic logic unit further operates to add the pedestal level P to the product $$\frac{y_A - y_C}{2 \tan \zeta_o},$$

this pedestal level being derived in the manner discussed above with respect to the equation (16C) or being obtained from the incoming television signal.

It is intended that the appended claims be interpreted as including all such changes and modifications.

What is claimed is:

1. In a system for digitizing a color television signal wherein the color television signal is sampled with a sampling signal whose rate is a multiple of the burst signal frequency and each sample is converted to a corresponding digital signal, a method for controlling the phase of the sampling signal comprising the steps of obtaining at least three samples of the burst signal included in said color television signal; determining a reference sampling phase as a function of at least two of said samples by deriving a calculated sample level from said at least two samples; sensing a phase error between the actual sampling phase of said sampling signal and said reference sampling phase by detecting the difference between said calculated sample level and the level of a predetermined one of said at least three samples; and adjusting the phase of said sampling signal in accordance with said detected difference in a direction to reduce said detected difference to a null value.

2. The method of claim 1 wherein said predetermined sample differs from both of said at least two samples.

3. The method of claim 2 wherein the rate of said sampling signal is an even multiple of twice the burst signal frequency.

4. The method of claim 1 wherein said step of adjusting the phase of said sampling signal comprises generating a control voltage, changing the magnitude of said control voltage by an incremental amount during each period of said burst signal, the change being a function of whether the level of said predetermined one sample exceeds or is less than said calculated sample level; and adjusting the phase of said sampling signal in accordance with said control voltage.

5. The method of claim 4 wherein said step of adjusting the phase of said sampling signal in accordance with said control voltage comprises generating said sampling signal with a controllable oscillator; deriving from said sampling signal a local oscillating signal whose frequency is equal to said burst signal frequency; shifting the phase of said local oscillating signal by an amount determined by said control voltage; phase comparing the phase-shifted local oscillating signal with the actual burst signal included in said color television signal; and modifying said controllable oscillator in accordance with said phase comparison so as to adjust the phase of said sampling signal.

6. The method of claim 1 wherein said step of obtaining at least three samples of the burst signal comprises producing sample levels $y_A$, $y_B$ and $y_C$ during each period of said burst signal; and wherein said step of deriving a calculated sample level comprises calculating the difference between two of said samples $(y_A - y_C)$ and multiplying said difference by a predetermined constant $$\left(\frac{1}{2\tan \zeta_o}\right)$$

to represent said calculated sample level $$\frac{y_A - y_C}{2 \tan \zeta_o},$$

where $\zeta_o$ represents a predetermined sampling phase.

7. The method of claim 6 wherein said burst signal is superimposed onto a pedestal level $\overline{P}$, and wherein said calculated sample is obtained by adding said pedestal level to said representation of said calculated sample level to produce $$\frac{y_A - y_C}{2 \tan \xi_o} + \overline{P}.$$

8. The method of claim 1 wherein said step of obtaining at least three samples of the burst signal comprises producing sample levels $y_A$, $y_B$ and $y_C$ during each period of said burst signal, storing a predetermined level $\overline{P'}$ which approximates the actual pedestal level $\overline{P}$ upon which said burst signal is superimposed, and obtaining levels ($\overline{A}$ and $\overline{C}$) representing the difference between two of said samples and said predetermined level $\overline{P'}$; and wherein said step of deriving a calculated sample level from said at least two of said samples comprises obtaining the sum and difference of said obtained levels, multiplying said sum by a predetermined constant, and adding the multiplied sum, the difference and the stored predetermined level.

9. The method of claim 1 wherein said step of obtaining at least three samples of the burst signal comprises producing sample levels $y_A$, $y_B$ and $y_C$ during each period of said burst signal, and digitizing said sample levels to produce respective digital samples $\overline{A}$, B and $\overline{C}$; and wherein said step of deriving a calculated sample level from said at least two of said samples comprises storing a respective digital representation of each calculated sample level as a function of various combinations of two of said digital samples $\overline{A}$ and $\overline{C}$ which are produced, and reading out a corresponding one of said stored digital representations in accordance with the two samples $\overline{A}$ and $\overline{C}$ actually produced.

10. The method of claim 9 wherein said step of detecting the difference between said calculated sample level and the level of a predetermined one of said three samples comprises comparing the read out stored digital representation and the remaining one of said digital samples B to produce a first error signal when said read out digital representation exceeds said remaining digital sample and to produce a second error signal when said read out digital signal is less than said remaining digital sample.

11. The method of claim 10 wherein said step of adjusting the phase of said sampling signal comprises generating a control voltage for determining the phase of said sampling signal; changing said control voltage by a predetermined amount in a first direction during a period of said burst signal when said first error signal is produced; changing said control voltage by said predetermined amount in a second direction during a period of said burst signal when said second error signal is produced; and using said control voltage to control the phase of said sampling signal.

12. A method of determining whether the burst signal of a color television signal is sampled in a predetermined phase relationship, comprising the steps of sampling said burst signal at a rate which is a multiple of the burst signal frequency; determining a theoretical sample level of said burst signal as a function of a plurality of the actual sample levels thereof, said theoretical sample level representing a sample level that would be obtained if said burst signal is sampled in said predetermined phase relationship; and detecting the difference between said theoretical sample level and a predetermined one of said actual sample levels.

13. The method of claim 12 wherein said step of determining a theoretical sample level of said burst signal comprises obtaining the difference between two actual sample levels; and multiplying said difference by a predetermined constant.

14. The method of claim 13 wherein said predetermined constant is a function of $\xi_o$, where $\xi_o$ is the phase angle at which said burst signal is sampled when said predetermined phase relationship is present.

15. The method of claim 14 wherein said burst signal is superimposed onto a pedestal level; and said step of determining a theoretical sample level of said burst signal further comprises adding said pedestal level to said multiplied difference.

16. The method of claim 15 wherein said step of obtaining the difference between two actual sample levels comprises storing a predetermined level which approximates the actual pedestal level of said burst signal; producing first and second difference levels representing the difference between said predetermined level and respective ones of said two actual sample levels; and obtaining the difference between said first and second difference levels.

17. The method of claim 16 wherein said step of adding said pedestal level to said multiplied difference comprises summing said first and second difference levels; combining the summed first and second difference levels and said stored predetermined level; and adding the combined levels to the multiplied said difference between said first and second difference levels.

18. The method of claim 12 wherein said step of determining a theoretical sample level of said burst signal comprises storing a respective digital representation of different theoretical sample levels as a function of various combinations of said plurality of actual sample levels; and reading out a corresponding one of said stored digital representations in accordance with said plurality of actual sample levels.

19. The method of claim 18 wherein said plurality of actual sample levels is equal to two actual sample levels.

20. The method of claim 19 wherein said burst signal is superimposed onto a pedestal level; and wherein said step of reading out a corresponding one of said stored digital representations comprises generating digital representations of said two actual sample levels by reducing each of said two actual sample levels by a predetermined level which approximates said pedestal level, and using said digital representations of said two actual sample levels to address said corresponding stored digital representation of said theoretical sample level.

21. Apparatus for use in a digital encoder for a color television signal, comprising sampling pulse generating means for generating sampling pulses with a rate that is a multiple of the burst signal frequency of said color television signal; sampling means responsive to said sampling pulses for sampling said color television signal, including said burst signal, and for digitizing each sample; theoretical sample level producing means for producing a theoretical sample level of said burst signal as a function of at least two actual samples thereof, said theoretical sample level representing a sample that would be obtained if said burst signal is sampled by sampling pulses which exhibit a predetermined phase with respect thereof; phase difference determining means for determining the difference between the actual phase of said sampling pulses and said predetermined phase in accordance with the difference between said theoretical sample level and an actual sample; and adjusting means responsive to said determined phase difference to adjust the phase of said sampling pulses so as to reduce said determined phase difference to a null value.

22. The apparatus of claim 21 wherein the rate of said sampling pulses is an even multiple of twice the burst signal frequency.

23. The apparatus of claim 21 wherein said theoretical sample level producing means comprises addressable storage means having plural addressable locations, each storing a digital representation of a theoretical sample level as a function of a respective one of different combinations of said two actual samples; and means for addressing said storage means with said two actual samples to read out therefrom the corresponding digital representation of said theoretical sample level.

24. The apparatus of claim 23 wherein said burst signal is superimposed onto a pedestal level; wherein each stored digital representation is a function of $$\frac{y_A - y_C}{K} + \overline{P},$$

where
$y_A$ represents one of said two samples,
$y_C$ represents the other of said two samples,
K is a constant that is a function of said predetermined phase, and
P represents said pedestal level;
and wherein said means for addressing is operative to generate an address for said addressable storage means in response to the combination of $y_A$ and $y_C$.

25. The apparatus of claim 24 wherein said means for addressing comprises means for reducing the samples $y_A$ and $y_C$ by a predetermined amount $\overline{P'}$, where $\overline{P'}$ represents a constant level approximating the actual pedestal level.

26. The apparatus of claim 25 wherein each stored digital representation is expressed as $$\frac{\overline{A} + \overline{C}}{2 \tan \zeta_o} + \frac{\overline{A} - \overline{C}}{2} + \overline{P}$$

where:
$\overline{A}$ is the sample $y_A$ reduced by $\overline{P'}$,
$\overline{C}$ is the sample $y_C$ reduced by $\overline{P'}$,
$\zeta_o$ is the phase angle of said burst signal at which sample $y_A$ is produced when said sampling pulses exhibit said predetermined phase; and wherein said means for addressing generates an address as a function of the combination of $\overline{A}$ and $\overline{C}$.

27. The apparatus of claim 26 wherein said addressable storage means comprises a read only memory.

28. The apparatus of claim 23 wherein said phase difference determining means comprises comparator means for comparing the digital representation read out of said storage means with a third of said actual samples and for producing a phase-control signal in response to said comparison.

29. The apparatus of claim 21 wherein said adjusting means comprises control voltage generating means for generating a control voltage to control the phase of said sampling pulses; and means for changing said control voltage in accordance with said difference between said theoretical sample level and an actual sample.

30. The apparatus of claim 29 wherein said means for changing said control voltage comprises means for increasing said control voltage by an incremental amount during a period of said burst signal when said theoretical sample level exceeds said actual sample; and means for decreasing said control voltage by said incremental amount during a period of said burst signal when said theoretical sample level is less than said actual sample.

31. The apparatus of claim 30 further comprising capacitance means; and wherein said means for increasing said control voltage comprises charging means for charging said capacitance means for a predetermined duration, and said means for decreasing said control voltage comprises discharge means for discharging said capacitance means for said predetermined duration.

32. The apparatus of claim 29 wherein said sampling pulse generating means comprises controllable oscillator means for generating said sampling pulses; and wherein said adjusting means further comprises frequency divider means coupled to said controllable oscillator means to produce a local oscillating signal of said burst signal frequency, phase shift means for shifting the phase of said local oscillating signal by an amount determined by said control voltage, phase comparator means for comparing the phases of said burst signal included in said color television signal and said phase-shifted local oscillating signal, and means for controlling said controllable oscillator means in response to said phase comparison.

33. Apparatus for determining if the burst signal of a color television signal is sampled at a predetermined phase angle thereof, comprising sampling means for sampling said burst signal at a rate that is a multiple of the burst signal frequency; theoretical sample level producing means for producing a theoretical sample level of said burst signal as a function of a plurality of the actual sample levels thereof, said theoretical sample level representing a sample that would be obtained if said burst signal is sampled at said predetermined phase angle; and determining means responsive to said theoretical sample level and a predetermined one of said actual sample levels for determining whether an actual sample of said burst signal is produced at said predetermined phase angle.

34. The apparatus of claim 33 wherein said theoretical sample level producing means comprises means for producing a signal representing the difference between two of said actual sample levels divided by a constant, said constant being a trigonometric function of said predetermined phase angle.

35. The apparatus of claim 34 wherein said burst signal is superimposed onto a pedestal level; and said means for producing a signal further comprises means for adding said pedestal level to said signal representing the difference between two of said actual sample levels divided by a constant.

36. The apparatus of claim 34 wherein said determining means comprises difference means for obtaining the difference between said produced signal and a third of said actual sample levels.

* * * * *